United States Patent
Coulon et al.

(10) Patent No.: US 9,667,319 B2
(45) Date of Patent: May 30, 2017

(54) COLLECTOR WIRE NETWORK FOR COMMUNICATION OF LOCALLY FIXED SYSTEMS PARTS WITH AT LEAST ONE VARIABLE-LOCATION SYSTEM PART

(71) Applicant: Siemens Aktiengesellschaft, Munich (DE)

(72) Inventors: David Coulon, Sindelfingen (DE); Albert Krenz, Ehningen (DE); Klaus-Peter Linzmaier, Winterbach (DE); Michael Wilding, Ditzingen (DE)

(73) Assignee: Siemens Aktiengesellschaft, Munich (DE)

( * ) Notice: Subject to any disclaimer, the term of this patent is extended or adjusted under 35 U.S.C. 154(b) by 6 days.

(21) Appl. No.: 14/916,922

(22) PCT Filed: Aug. 28, 2014

(86) PCT No.: PCT/EP2014/068253
§ 371 (c)(1),
(2) Date: Mar. 4, 2016

(87) PCT Pub. No.: WO2015/036252
PCT Pub. Date: Mar. 19, 2015

(65) Prior Publication Data
US 2016/0218772 A1    Jul. 28, 2016

(30) Foreign Application Priority Data
Sep. 11, 2013   (EP) .................................... 13183915

(51) Int. Cl.
*H04B 3/54*     (2006.01)
*H04L 12/40*    (2006.01)
(Continued)

(52) U.S. Cl.
CPC .................. *H04B 3/54* (2013.01); *B61L 3/18* (2013.01); *B61L 15/0036* (2013.01);
(Continued)

(58) Field of Classification Search
CPC combination set(s) only.
See application file for complete search history.

(56) References Cited

U.S. PATENT DOCUMENTS

2013/0138996 A1   5/2013   Beyer et al.

OTHER PUBLICATIONS

Siemens AG, PRB Segment Controller User's Guide, 2005, Siemens AG.*

(Continued)

*Primary Examiner* — Wednel Cadeau
(74) *Attorney, Agent, or Firm* — Cozen O'Connor

(57) ABSTRACT

A collector wire network for communicating locally fixed system parts having at least one variable-location system part, wherein data transmission devices are each assigned a reception range, where the reception range is mapped onto a section that results from a length of a collector wire segment plus a first overlap length and a second overlap length, the data transmission device connected to the respective collector wire segment is configured such that a level of the data signal transmitted thereby is matched to a respective reception range such that, because of attenuation of the level, caused by line damping along the first and second conductors and the coupling elements, the level in a receiving device of a variable-location system part which is located outside the reception range no longer recognized as a valid signal.

16 Claims, 4 Drawing Sheets

(51) Int. Cl.
*H04L 12/42* (2006.01)
*B61L 3/18* (2006.01)
*B61L 15/00* (2006.01)

(52) U.S. Cl.
CPC ........ H04L 12/40169 (2013.01); H04L 12/42 (2013.01); *H04L 2012/40293* (2013.01)

(56) References Cited

OTHER PUBLICATIONS

"PRB Segment Controller Anwenderbeschreibung, Power Rail Booster (PRB) Segment Controller User Guide"; Siemens AG; pp. 1-31; XP055100914; 2006.
Siemens AG; "Power Rail Booster—User's Guide Version 12/2005"; pp. 1-49; XP055088492; 2005.

* cited by examiner

COLLECTOR WIRE NETWORK FOR COMMUNICATION OF LOCALLY FIXED SYSTEMS PARTS WITH AT LEAST ONE VARIABLE-LOCATION SYSTEM PART

CROSS-REFERENCE TO RELATED APPLICATIONS

This is a U.S. national stage of application No. PCT/EP2014/068253 filed 28 Aug. 2014. Priority is claimed on European Application No. 13183915.1 filed 11 Sep. 2013, the content of which is incorporated herein by reference in its entirety.

BACKGROUND OF THE INVENTION

1. Field of the Invention

The invention relates to a collector wire network for the communication of locally fixed system parts with variable-location system parts.

The invention also relates to a method for implementing communication between the locally fixed system parts and the variable-location system parts in the collector wire network.

2. Description of the Related Art

The manual "PRB Segment Controller Anwenderbeschreibung, Ausgabe 12/2005, 6ES7972-4AA50-0XAO" [PRB Segment Controller User's Guide, Edition 12/2005, 6ES7972-4AA50-0XAO] by Siemens AG already describes a collector wire network and a method for the communication of locally fixed system parts having variable-location system parts. However, a PROFIBUS communication is used here as a communication method. PROFIBUS communication is a transmission system, which uses an access method in accordance with the token ring/master-slave. Only one subscriber can access the transmission medium at any one time. With the PROFIBUS communication, transmission speeds of 9.6 kBit/s to 500 kBit/s are reached. A field bus system with a PROFIBUS communication thus represents a relatively narrowband communication method.

SUMMARY OF THE INVENTION

It is therefore the object of the invention to provide a collector wire network for communication of locally fixed system parts with variable-location system parts and/or to provide a method for implementing the communication, in which higher transmission rates can be achieved.

These and other objects and advantages are achieved in accordance with the invention by providing a collector wire network having a plurality of collector wire segments, where each segment has a first conductor and a second conductor, upon which communication data and a supply voltage can be transmitted for the variable-location system parts, a plurality of voltage sources, which are each connected to the first and the second conductor to provide the supply voltage, a plurality of data transmission devices, which are likewise connected to the first and the second conductor for data transmission between the locally fixed system parts and the variable-location system parts, a plurality of coupling elements, where one coupling element couples a first collector wire segment at a transition point with a second collector wire segment, and where the coupling elements are configured such that data can be transmitted between the collector wire segments, but the connected supply voltage is blocked.

In accordance with the invention, each data transmission device is assigned a reception range, where the reception range is mapped onto a section, which results from a length of a collector wire segment plus a first overlap length and a second overlap length, where the data transmission device connected to the respective collector wire segment is configured such that a level of a data signal transmitted thereby is matched to the respective reception range such that, because of attenuation of the level, caused by line damping along the first and second conductors and the coupling elements, the level in a receiving device of the variable-location system parts that is located outside the reception range can no longer be evaluated/recognized as a valid signal. A collector wire network configured in this way allows for a newer communication method, i.e., a PROFINET communication method based on Ethernet technology.

At an increased data transmission rate, even longer segments can now additionally be used with great advantage. To this end, with a larger extension of collector wire segments or with a large extension of the entire collector wire network and additionally a larger number of subscribers, where a subscriber is considered to be a variable-location system part, data signals are fed in at several points in the system. Data signals are fed in, for instance, via a data transmission device, which is permanently assigned to a collector wire segment. A reception range, within which communication with the variable-location system parts is possible, is then produced for each infeed point of a data signal by way of a data transmission device.

Within the meaning of the invention, variable-location system parts are to be understood to mean trolleys which move in a transport system, wherein fixedly installed control systems for the higher-level control of the transport system represent the locally fixed system parts. With transport systems of this type, a transport path, such as a rail system, is subdivided into sections, preferably into segments, where almost any number of vehicles or trolleys can move on these segments. To ensure that the behavior and thus a driving profile of a trolley within the transport system, such as a production plant for automotive construction, can be adjusted for the different manufacturing processes, communication is required between a central system controller and the trolleys.

In a preferred embodiment, a first overlap area is formed between the first collector wire segment and the second collector wire segment, in which first overlap area a first level transmitted by a first data transmission device and a second level transmitted by a second data transmission device can be each evaluated in the receiving device of the variable-location system part as a valid signal. This is advantageous in that communication failures cannot occur during a transition of a variable-location system part from one segment to another segment.

Each data transmission device is preferably assigned a communication channel, where in a first alternative embodiment a unique segment number for logical separation of the data transmission is assigned to each data transmission device and in a second alternative, and each data transmission device is assigned a unique frequency band for data transmission.

In an embodiment with a unique frequency band, frequency multiplexing is preferably used, where each data transmission device transmits its data on the conductor in a frequency band permanently assigned to it.

In an embodiment with a unique segment number for logical separation of the collector wire segments, each data transmission-device is assigned a unique network management key, for instance. A network management key allows the collector wire network to be subdivided into independent logical networks, i.e., the collector wire segments.

In a particularly robust embodiment of the collector wire network, at least one variable-location system part is connected to the first and second conductors via sliding contacts and the receiving device is configured such that a first modem and a second modem are created, which are configured to maintain a first communication link to a data transmission device and to establish a second communication link to another data transmission device and after the second communication link is established and available, to terminate the first communication link. In order not to experience an interruption in communication from collector wire segment to collector wire segment while the variable-location system part is passing through, the receiving device with its two modems is configured such that a communication link is maintained between a first modem and a first data transmission device via a first communication channel, while a second communication link is in the meantime established with a second data transmission device of another collector wire segment via a second modem. Once the second link is available, the first link can subsequently be terminated.

The collector wire network is advantageously formed with data transmission devices and at least one receiving device which operate in accordance with Ethernet technology.

The following advantages are now achieved with the collector wire network mentioned at the start:

1) It is possible to dispense with the use of a radio-based solution, because with radio-based solutions, there may be crosstalk between a number of such systems.
2) It is possible to dispense with known communication methods via slotted hollow conductors, in particular different types of circuit along the rails (e.g., collector wires for power, and hollow conductors for data) can be avoided.
3) An extension of the collector wire network length from several 100 m up to a few kilometers is now possible.
4) With the novel communication method, a larger number of subscribers, preferably 150 to 250 subscribers, can be reached in the collector wire network.

It is also an object of the invention to provide a method for implementing a communication between locally fixed system parts and variable-location system parts, where a plurality of collector wire segments are arranged behind one another, communication data and a supply voltage for the variable-location system parts are transmitted in each collector wire segment via a first conductor and a second conductor, voltage sources are used to feed the supply voltage into the respective first and second conductor, where data transmission devices are used, which are likewise connected to the first and the second conductor to transmit data between the locally fixed system part and the variable-location system part, the collector wire segments are coupled to one another via coupling elements, the coupling elements transmit data, but block the connected supply voltage, with each data transmission device being assigned a reception range in the process, where the reception range is mapped onto a section, which results from a length of a collector wire segment, plus a first overlap length and a second overlap length, and where the data transmission device connected to the respective collector wire segment is operated such that a level of a data signal transmitted thereby is matched to the respective reception range such that because of attenuation of the level, caused by line damping along the first and second conductors and the coupling elements, the level in a receiving device of the variable-location system part that is located outside the reception range is no longer recognized as a valid signal.

Here, a first overlap area is preferably generated between the first collector wire segment and the second collector wire segment, in which a first level transmitted by a first data transmission device and a second level transmitted by a second data transmission device are each recognized in a receiving device of the variable-location system part as a valid signal.

In order to distinguish the respective valid signal, each data transmission device is preferably assigned a communication channel.

To this end, a unique segment number for logical separation of the data transmission can be assigned to each data transmission device, on the one hand, or a unique frequency band for data transmission can be assigned to each data transmission device, on the other hand.

Furthermore, the method is preferably implemented such that if at least one variable-location system part is connected to the first and second conductor by way of sliding contacts, the receiving device is operated such that a first modem and a second modem are operated within the overlap area such that a first communication link to a data transmission device is firstly maintained and a second communication link to another data transmission device is established and after the second communication link is established and available, the first communication link is terminated.

The method for implementing communication between locally fixed system parts and variable-location system parts is preferably operated with data transmission devices and at least one receiving device, which are operated in accordance with Ethernet technology.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In order to further explain the invention, the drawing shows an exemplary embodiment, in which.

DETAILED DESCRIPTION OF THE EXEMPLARY EMBODIMENTS

Figure 1:
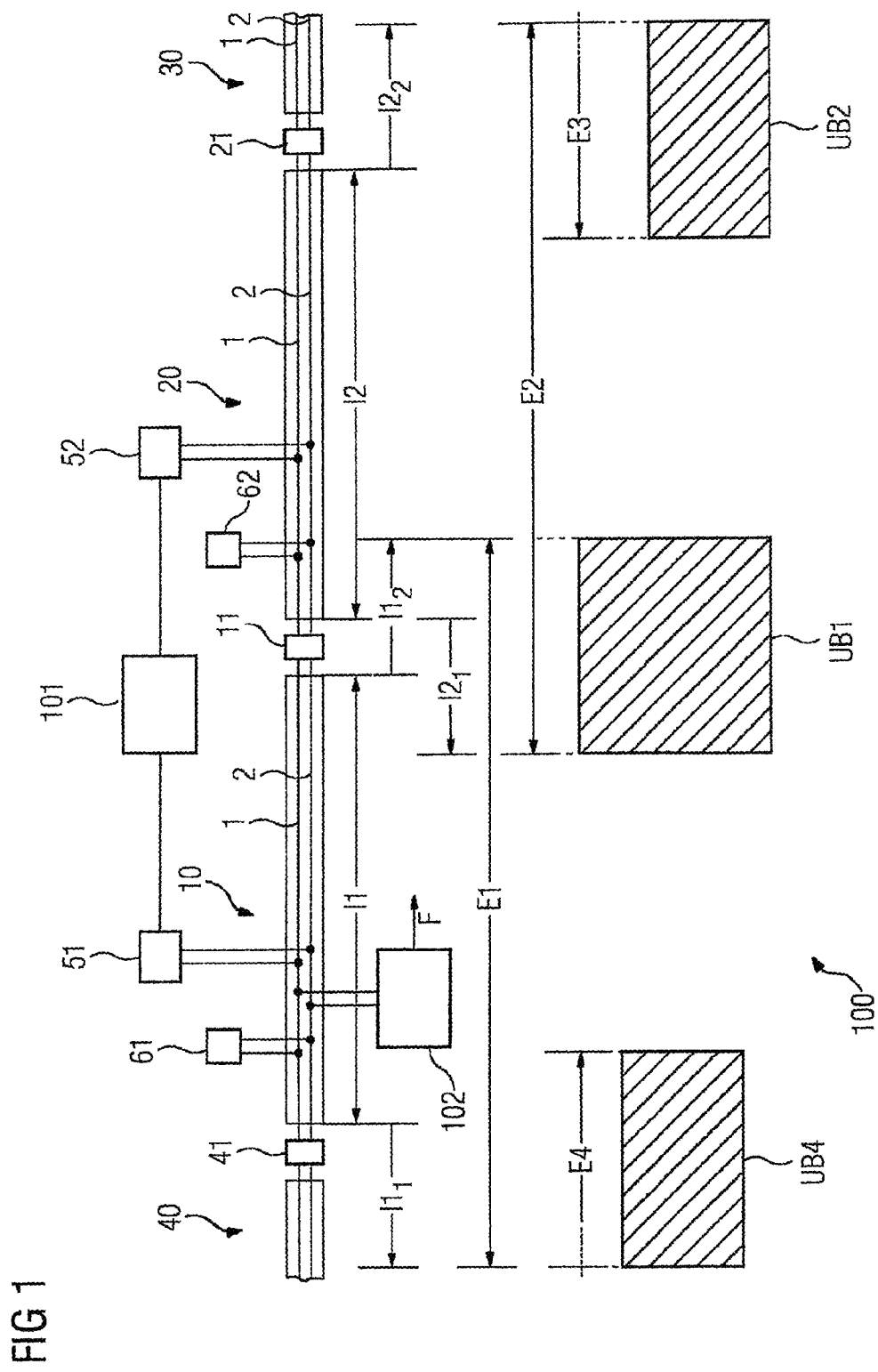
FIG. 1 shows a cutout from a collector wire network extending longitudinally in accordance with the invention.

With reference to FIG. 1, shown therein is a cutout of a collector wire network 100 for communication of locally fixed system parts 101 with variable-location system parts 102. The variable-location system part 102 is formed, for instance, as a transport vehicle, which is connected to a first conductor 1 and a second conductor 2 of a first collector wire segment 10 via contact lines and moves in the direction of travel F.

To transport a transport vehicle through a number of segments, the first collector wire network 10, a second collector wire network 20, a third collector wire network 30 and a fourth collector wire network 40 are available, where each segment has a first conductor 1 and a second conductor 2, upon which communication data and a supply voltage for the variable-location system parts 102 can be transmitted.

A first voltage source 61 is connected on the first collector wire segment 10 to the first conductor 1 and to the second conductor 2 in order to provide the supply voltage, a second voltage source 62 is connected to the first conductor 1 and the second conductor 2 of the second collector wire segment 20 in order to provide the supply voltage for the second collector wire segment 20. For the data transmission, a first data transmission device 51 is connected in each case to the first conductor 1 and the second conductor 2 on the first collector wire segment 10. A second data transmission device 52 is likewise connected to the first conductor 1 and the second conductor 2 of the second collector wire segment 20 on the second collector wire segment 20. The first data transmission device 51 and the second data transmission device 52 are connected to the locally fixed system part 101, which is configured, for instance, as a control system or a master computer.

The first collector wire segment 10 is coupled to the second collector wire segment 20 via a first coupling element 11, for the transition from the second collector wire segment 20 to the third collector wire segment 30, the second collector wire segment 20 is coupled via a second coupling element 21 to the third collector wire segment 30, for a transition from the first collector wire segment 10 to the fourth collector wire segment 40, both are coupled via a fourth coupling element 41.

The first data transmission device 51 is assigned a first reception range E1, where the first reception range E1 is mapped onto a section that results from a first segment length 11 of the first collector wire segment 10 plus a first overlap length $11_1$ and a second overlap length $11_2$. The first reception range E1 is therefore substantially mapped onto the first segment length 11 of the first collector wire segment 10, where the first reception range E1 is intentionally configured so that with the first overlap length $11_1$ it protrudes into the fourth collector wire segment 40 and with a second overlap length $11_2$, starting from the first collector wire segment 10, it protrudes into the second collector wire segment 20.

The first data transmission device 51 is configured here such that a level of a data signal transmitted thereby is matched to the first reception range E1 such that because of attenuation of the level, caused by line damping along the first and second conductors 1, 2 and the fourth coupling element 41 or the first coupling element 11, the level in a receiving device 56 of the variable-location system part 102 that is located outside the reception range E1 can no longer be evaluated/recognized as a valid signal. Alternatively, with respect to a signal that can be evaluated/recognized as valid, it is possible to receive the level transmitted by the first data transmission device 51 not only on the first conductor 1 and the second conductor 2 beyond the first segment length $11_1$, but instead it can also still be evaluated/recognized in the area of the first overlap length 11, which extends into the fourth collector wire segment 40 or also in the area of the second overlap length $11_2$, which extends into the second collector wire segment 20.

A first overlap area UB1 thus results between the first collector wire segment 10 and the second collector wire segment 20, in which a first level transmitted by the first data transmission device 51 and a second level transmitted by the second data transmission device 52 can be each evaluated in the receiving device 56 of the variable-location system part 102 as a valid signal.

Here, it should be noted the second collector wire segment 20 is assigned a second reception range E2 that results from the second segment length 12 plus an associated first overlap length $12_1$ and a second associated overlap length $12_2$.

A second overlap area UB2 is formed between the second collector wire segment 20 and the third collector wire segment 30, where the second overlap area results due to the overlap of the second reception range E2 and a third reception range E3, which is associated with the third collector wire segment 30. Similarly, a fourth overlap area UB4 results at the segment boundary between the fourth collector wire segment 40 and the first collector wire segment 10, where the overlap area UB4 resulting due to the overlap of a fourth reception range E4 with the first reception range E1.

The variable-location system part 102 and the reception device 56 contained therein (see FIG. 2) are configured such that if the variable-location system part 102 is disposed in the first overlap area UB1, then it maintains a first communication link to the first data transmission device 51 and attempts to establish a second communication link with the second data transmission device 52, where after the second communication link has been successfully established and if the second communication link remains available, the first communication link is terminated.

The establishment and termination of the communication link with the different data transmission devices in the various transmission ranges is to be seen as analogous.

Figure 2:
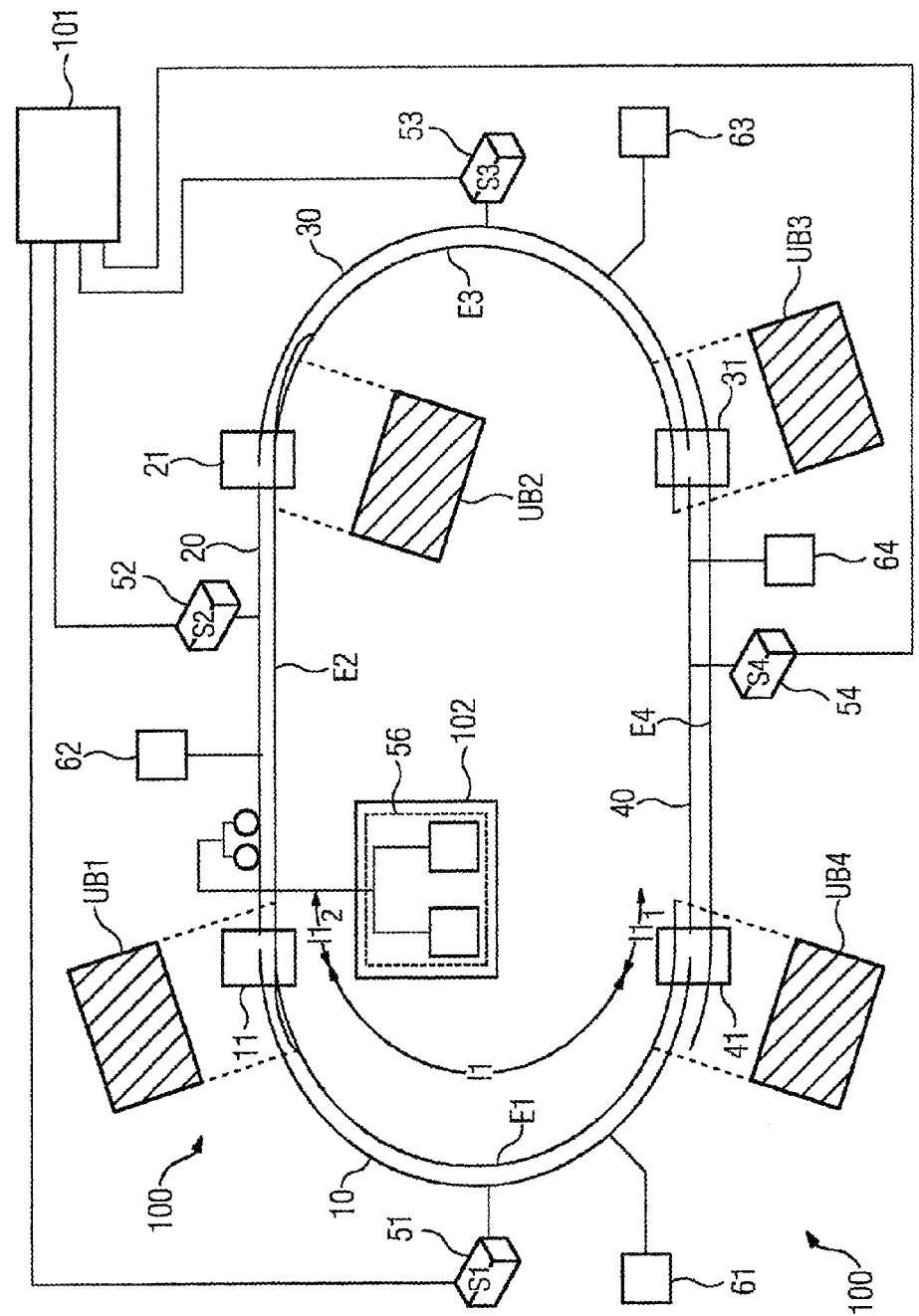
FIG. 2 shows the collector wire network in a closed oval embodiment with four collector wire segments in accordance with the invention.

FIG. 2 shows another representation of the collector wire network 100 with its four collector wire segments 10, 20, 30, 40. The four collector wire segments 10, 20, 30, 40 are joined together to form an oval. In each case, the first coupling element 11, the second coupling element 21, the third coupling element 31 and the fourth coupling element 41 are connected between the collector wire segments at the segment boundaries of the collector wire segments in order to couple the collector wire segments.

A unique segment number S1, S2, S3, S4 is assigned in each case to the data transmission devices 51, 52, 53, 54 for the logical separation of the data transmissions.

The feeding-in of data signals via the data transmission devices occurs according to FIG. 2 at several points in the transport system, i.e., approximately in the center of the first collector wire segment 10 with the first transmission device 51, approximately in the center of the second collector wire segment 20 with the second data transmission device 52, approximately in the center of the third collector wire segment 30 with the third data transmission device 53 and approximately in the center of the fourth collector wire segment 40 with the fourth data transmission device 54. This results in a reception range E1, E2, E3, E4 for each data transmission device or for each data infeed point, within which reception range communication is possible with the variable-location system part 102. The reception ranges E1, E2, E3, E4 overlap at their boundaries. As a result, a mobile subscriber can successively check into the individual reception ranges E1 E2, E3, E4 while passing through the system.

Each data transmission device is preferably assigned a network management key (NMK). This allows the collector wire network 100 to be subdivided into independent logical networks. Here, the data transmission devices 51, 52, 53, 54 represent the logical networks, which each use a different network management key.

To ensure a deterministic transmission function, it is always necessary to permanently assign one data transmission device to each mobile subscriber. To avoid clashes between the data transmission devices, it is moreover necessary to separate the logical network of each data transmission device from the other logical networks of the other data transmission devices such that, for data transmission purposes, these can access the conductors of the collector wire segment independently and at the same time as one another.

In order to establish the logical networks, the HPAV standard can now be used, for instance. The standard provides for a key, known as the network management key (NMK), to be allocated in order to encrypt the data traffic. In this way, only subscribers with the same NMK can communicate with one another. In addition to the NMKs, modems can be combined to form networks via a network ID (NID).

As the HPAV method uses frequencies in the range of 2 MHz to 30 MHz, the data signals can to a certain extent be transmitted from one collector wire segment to the other collector wire segment via the coupling elements 11, 21, 31, 41. The upper frequencies of the frequency range used are thus able to couple over onto other conductors on adjacent collector wire segments, i.e., across the coupling points. By means of this coupling-over mechanism, the range of the transmitted signals is not directly limited by a segment length 11.

Figure 3:
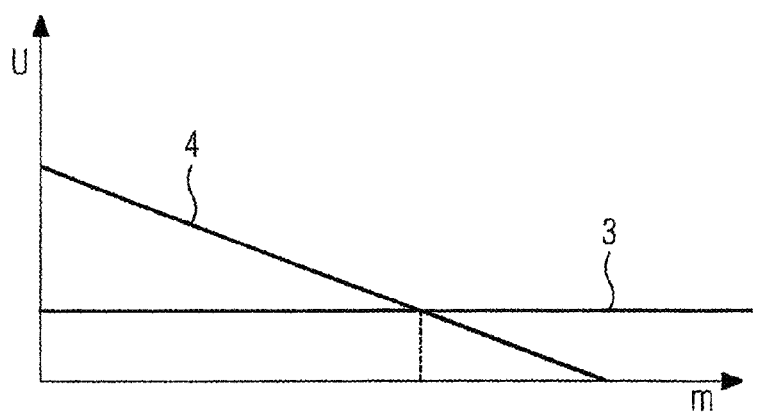
FIG. 3 shows a graphical plot of a level curve of a transmit signal of a data transmission device.

A transmitted reception level across a distance in meters is shown in FIG. 3. A level curve 4 clearly shows that the level reduces with an increasing segment length. A maximum length of a segment is thus provided if the level curve 4 intersects a limit value line 3 for a minimum level.

Figure 4:
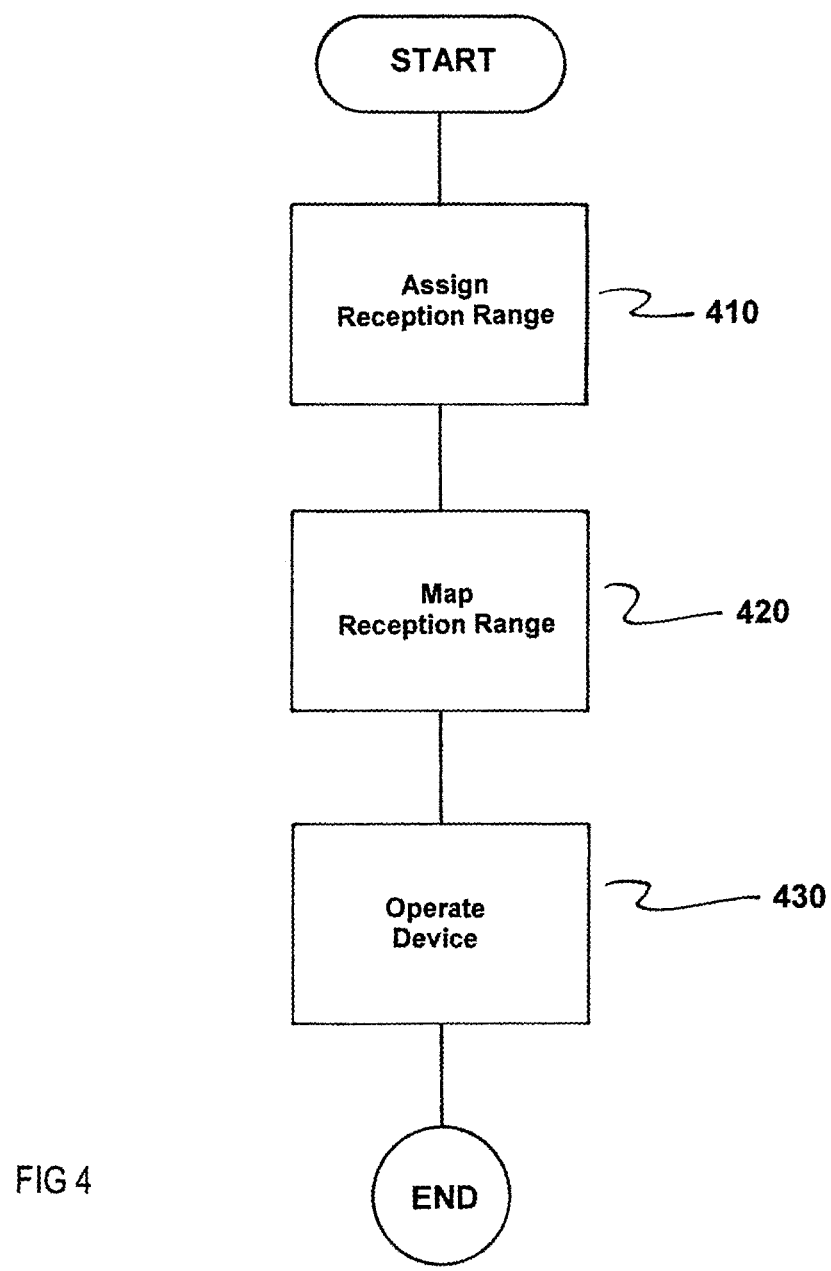
FIG. 4 is flowchart of the method in accordance with the invention.

FIG. 4 is a flowchart of a method for implementing communication between locally fixed system parts (101) and variable-location system parts (102), where a plurality of collector loop segments (10, 20, 30, 40) are arranged behind one another, communication data and a supply voltage for the variable-location system part (102) are transmitted in each collector wire segment (10, 20, 30, 40) via a first conductor (1) and a second conductor (2), voltage sources (61, 62, 63, 64) are utilized to feed the supply voltage into respective first and second conductors (1, 2), data transmission devices (51, 52, 53, 54) are utilized, which are connected to the first and the second conductor (1, 2) for data transmission between the locally fixed system part (101) and the variable-location system part (102), and the collector loop segments (10, 20, 30, 40) are coupled to one another via coupling elements (11, 12, 13, 14) which transmit data but block the connected supply voltage.

The method comprises assigning each data transmission device (51, 52, 53, 54) a reception range (E1, E2, E3, E4), as indicated in step 410.

Next, the reception range (E1, E2, E3, E4) is mapped onto a section which results from a length (11, 12, 13, 14) of a collector wire segment (10, 20, 30, 40) plus a first overlap length ($11_1$) and a second overlap length ($11_2$), as indicated in step 420.

A data transmission device (51, 52, 53, 54) connected to a respective collector wire segment (10, 20, 30, 40) is then operated such that a level of a data signal transmitted thereby is matched to a respective reception range (E1, E2, E3, E4) such that, because of attenuation of the level, caused by line damping along the first and second conductors (1, 2) and the coupling elements (11, 12, 13, 14), the level in a receiving device (56) of the variable-location system part (102) which is located outside the reception range (E1, E2, E3; E4) is no longer recognized as a valid signal, as indicated in step 430.

While there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A collector wire network communicating locally fixed system parts with at least one variable-location system part, comprising:
   a plurality of collector wire segments, each segment having a first conductor and a second conductor, upon which communication data and a supply voltage are transmittable for the at least one variable-location system parts;
   a plurality of voltage sources, each said plurality of voltage sources being are connected to the first and the second conductors to provide the supply voltage;
   a plurality of data transmission devices, each of said plurality of data transmission devices being connected to the first and the second conductor for data transmission between the locally fixed system parts and the at least one variable-location system part;
   a plurality of coupling elements, one coupling element of said plurality of coupling elements coupling a first collector wire segment of said plurality of collector wire segments at a transition point with a second collector wire segment of said plurality of collector wire segments, and the plurality of coupling the coupling elements being formed such that data is transmittable between the plurality of collector wire segments, while the connected supply voltage is blocked;
   wherein each of said plurality of data transmission devices is assigned a reception range which is mapped onto a section, which results from a length of a collector wire segment of said plurality of collector wire segments plus a first overlap length and a second overlap length;
   wherein a data transmission device of said plurality of data transmission devices connected to a respective collector wire segment of said plurality of collector wire segments is configured such that a level of a data signal transmitted thereby is matched to a respective reception range, and such that, because of attenuation of the level, caused by line damping along the first and second conductors and the plurality of coupling elements, a level in a receiving device of the at least one variable-location system part which is located outside the reception range is no longer recognized as a valid signal.

2. The collector wire network as claimed in claim 1, wherein a first overlap area is formed between the first collector wire segment and the second collector wire segment, and wherein a first level transmitted by a first data transmission device and a second level transmitted by a second data transmission device are each recognized in the receiving device of the at least one variable-location system part as a valid signal.

3. The collector wire network as claimed in claim 1, wherein each data transmission device is assigned a communication channel.

4. The collector wire network as claimed in claim 1, wherein the at least one variable-location system part is connected to the first and second conductor via sliding contacts and the receiving device is configured such that a first modem and a second modem are created, said first and second modems being configured to maintain a first communication link to a data transmission device and to establish a second communication link to another data transmission device and after the second communication link is established and available, to terminate the first communication link.

5. The conductor loop network as claimed in claim 1, further comprising:
The plurality of data transmission devices and at least one receiving device which operate in accordance with Ethernet technology.

6. The collector wire network as claimed in claim 2, wherein each data transmission device is assigned a communication channel.

7. The collector wire network as claimed in claim 3, wherein each data transmission device is assigned a unique segment number for the logical separation of the data transmission.

8. The collector wire network as claimed in claim 3, wherein each data transmission device is assigned a unique frequency band for data transmission.

9. A method for implementing communication between locally fixed system parts and variable-location system parts, the method comprising:
arranging a plurality of collector loop segments behind one another;
transmitting communication data and a supply voltage for the variable-location system part in each collector loop segment via a first conductor and a second conductor;
utilizing voltage sources to feed the supply voltage into respective first and second conductors;
utilizing data transmission devices, which are connected to the first and the second conductor for data transmission between the locally fixed system part and the variable-location system part;
coupling the collector loop segments to one another via coupling elements which transmit data but block a connected supply voltage;
assigning each data transmission device a reception range;
mapping the reception range onto a section which results from a length of a collector wire segment plus a first overlap length and a second overlap length; and
operating a data transmission device connected to a respective collector wire segment such that a level of a data signal transmitted thereby is matched to a respective reception range such that, because of attenuation of the level, caused by line damping along the first and second conductors and the coupling elements, the level in a receiving device of the variable-location system part which is located outside the reception range is no longer recognized as a valid signal.

10. The method as claimed in claim 9, wherein a first overlap area is generated between the first collector wire segment and the second collector wire segment, in which overlap area a first level transmitted by a first data transmission device and a second level transmitted by a second data transmission device are recognized in the receiving device of the variable-location system part as a valid signal in each case.

11. The method as claimed in claim 9, wherein each of said plurality of data transmission devices is assigned a communication channel.

12. The method as claimed in claim 9, wherein at least one variable-location system part is connected to the first and second conductors via sliding contacts and the receiving device is operated such that a first modem and a second modem are operated within the overlap area such that a first communication link to a data transmission device of said plurality of data transmission devices is firstly maintained and a second communication link to another data transmission device of said plurality of data transmission devices is established and after the second communication link is established and available, the first communication link is terminated.

13. The method as claimed in claim 9 wherein the plurality of data transmission devices and at least one receiving device are operated in accordance with Ethernet technology.

14. The method as claimed in claim 10, wherein each of said plurality of data transmission devices is assigned a communication channel.

15. The method as claimed in claim 11, wherein each of said plurality of data transmission devices is assigned a unique segment number for logical separation of the data transmission.

16. The method as claimed in claim 11, wherein each of said plurality of data transmission devices is assigned a unique frequency band for data transmission.

* * * * *